(12) United States Patent
Eshkoli et al.

(10) Patent No.: US 9,035,990 B2
(45) Date of Patent: *May 19, 2015

(54) METHOD AND SYSTEM FOR PROVIDING CONTINUOUS PRESENCE VIDEO IN A CASCADING CONFERENCE

(71) Applicant: Polycom, Inc., San Jose, CA (US)

(72) Inventors: Noam Eshkoli, Tel Mond (IL); Oded Gants, Hashomron (IL)

(73) Assignee: Polycom, Inc., San Jose, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/868,733

(22) Filed: Apr. 23, 2013

(65) Prior Publication Data

US 2013/0235147 A1   Sep. 12, 2013

Related U.S. Application Data

(60) Division of application No. 12/885,859, filed on Sep. 20, 2010, now Pat. No. 8,446,451, which is a continuation of application No. 11/365,115, filed on Mar. 1, 2006, now Pat. No. 7,800,642.

(51) Int. Cl.
*H04N 7/14*   (2006.01)
*H04N 7/15*   (2006.01)
*H04L 12/18*   (2006.01)
*H04M 3/56*   (2006.01)

(52) U.S. Cl.
CPC ............ *H04N 7/152* (2013.01); *H04L 12/1822* (2013.01); *H04M 3/563* (2013.01); *H04M 3/565* (2013.01); *H04M 3/567* (2013.01); *H04M 2201/50* (2013.01)

(58) Field of Classification Search
USPC ........................................................ 709/204
See application file for complete search history.

(56) References Cited

U.S. PATENT DOCUMENTS

| | | | |
|---|---|---|---|
| 6,300,973 | B1 | 10/2001 | Feder et al. |
| 6,496,216 | B2 | 12/2002 | Feder et al. |
| 6,683,909 | B1 | 1/2004 | Falco |
| 6,757,005 | B1 | 6/2004 | Elbaz et al. |
| 7,084,898 | B1 | 8/2006 | Firestone et al. |
| 7,113,992 | B1 | 9/2006 | Even et al. |
| 7,174,365 | B1 | 2/2007 | Even et al. |

(Continued)

FOREIGN PATENT DOCUMENTS

| | | |
|---|---|---|
| WO | 02/060126 | 8/2002 |
| WO | 05/004481 | 1/2005 |

OTHER PUBLICATIONS

European Search Report for related EP Application No. 07003731.2 dated Apr. 13, 2010, Robert Van der Zaal.

*Primary Examiner* — Maria El-Zoobi
(74) *Attorney, Agent, or Firm* — Wong, Cabello, Lutsch, Rutherford & Brucculeri, L.L.P.

(57) ABSTRACT

Disclosed herein are methods and systems for providing continuous presence video stream in a cascading video conference, i.e., a video conference that is conducted over more than one MCU. A cascading continuous presence composition controller (CCCC) selects which endpoints from among all of the endpoints participating in the conference should be displayed in the layout, regardless of which endpoints are associated with which MCU. The CCCC can be resident on one of the MCUs, resident on a cascading conference server, or can be distributed among all of the MCUs involved in a cascading conference.

13 Claims, 8 Drawing Sheets

(56) References Cited

U.S. PATENT DOCUMENTS

| | | |
|---|---|---|
| 7,492,730 B2 | 2/2009 | Eshel et al. |
| 7,800,642 B2 * | 9/2010 | Eshkoli et al. ............. 348/14.08 |
| 8,446,451 B2 * | 5/2013 | Eshkoli et al. ............. 348/14.01 |
| 2002/0159394 A1 | 10/2002 | Decker et al. |
| 2002/0188731 A1 | 12/2002 | Potekhin et al. |
| 2003/0103468 A1 | 6/2003 | Seavers et al. |
| 2003/0174202 A1 | 9/2003 | Eshkoli et al. |
| 2004/0042553 A1 | 3/2004 | Elbaz et al. |
| 2004/0257433 A1 | 12/2004 | Lia et al. |
| 2005/0058088 A1 | 3/2005 | Decker et al. |
| 2005/0091380 A1 | 4/2005 | Gonen et al. |
| 2005/0157164 A1 | 7/2005 | Eshkoli et al. |
| 2006/0158510 A1 | 7/2006 | Lia et al. |
| 2006/0233120 A1 | 10/2006 | Eshel et al. |
| 2006/0248210 A1 | 11/2006 | Kenoyer |
| 2007/0091169 A1 | 4/2007 | Zhang et al. |
| 2013/0329872 A1 * | 12/2013 | Rice et al. ................. 379/93.01 |

* cited by examiner

METHOD AND SYSTEM FOR PROVIDING CONTINUOUS PRESENCE VIDEO IN A CASCADING CONFERENCE

CROSS REFERENCE TO RELATED APPLICATIONS

This application is a divisional of U.S. patent application Ser. No. 12/885,859 entitled "Method and System for Providing Continuous Presence Video in a Cascading Conference" filed Sep. 20, 2010, which is a continuation of U.S. patent application Ser. No. 11/365,115 entitled "Method and System for Providing Continuous Presence Video in a Cascading Conference" filed Mar. 1, 2006 now U.S. Pat. No. 7,800,642, which are incorporated by reference in their entirety herein.

TECHNICAL FIELD

The present disclosure relates to multipoint conferencing and more particularly to continuous presence video layout in a cascading conference conducted over two or more multipoint control units (MCUs).

BACKGROUND ART

Companies and organizations increasingly use audio/video conferencing and multipoint conferencing to improve communication and efficiency within the organization. Large organizations distribute a large number of multimedia endpoints throughout the organization. Usually, one or more multipoint control units (MCUs) serve the internal multipoint multimedia conferencing needs of these endpoints. Organizations that do not have private MCUs may purchase conferencing services from a multimedia conferencing service provider that has one or more MCUs.

A multimedia endpoint is a networked terminal that is capable of providing real-time, two-way audiovisual communication with other terminals or an MCU. An endpoint can provide speech only; speech and video; or speech, data and video communication. A MCU is a conference control entity located at a node of the network or in a terminal. The MCU receives multiple media channels from endpoints via access ports. According to certain criteria, the MCU processes audiovisual and data signals and distributes the processed signals to the connected channels. Examples of MCUs include the MGC-100 (Polycom Inc.). A more thorough definition of an endpoint (terminal) and an MCU can be found in the International Telecommunication Union ("ITU") standards, such as but not limited to the H.320, H.324, and H.323 standards. Additional information regarding the ITU standards can be found at the ITU website.

Usually a MCU that is located in a terminal has limited functionality. For example, such an MCU might be capable of conducting a conference of only up to four participants. Model number VSX 8000 (Polycom Inc.) is an example for a terminal that includes an MCU.

Videoconferences can be conducted by two or more MCUs. One example is when the videoconference requires more resources than are available on a single MCU. In such a case, the conferees may be divided into two or more groups and each group may be associated with a different MCU. As another example, in a conference between conferees located in different sites, each site having its own MCU, each conferee may use his own local MCU and the entire conference may be conducted by cascading the different local MCUs. Those skilled are familiar with other examples of using cascades of MCUs to conduct videoconferences.

Some techniques have been disclosed for utilizing the resources of one or more MCUs, for cascading one or more MCUs, and generally for improving resource usage of one or more MCUs. See, for example, U.S. patent application Ser. Nos. 09/708,898 and 09/852,438; PCT international published patent applications WO02/060126 and WO2005/004481; U.S. Patent Application Publication No. 2003/0103468; and U.S. patent application Ser. No. 11/109,563, each of which are incorporated herein by reference.

In a common cascading conference, one of the MCUs can be defined as a master MCU (MMCU) and the other MCUs can be defined as slave MCUs (SMCUs). The MMCU has a multimedia connection to each one of the SMCUs. The multimedia connection between the MMCU and each one of the SMCUs can be similar to a multimedia connection with an endpoint of a conferee.

Usually a SMCU receives audio and video from conferees that are associated with the SMCU, mixes the audio, and handles the video of its associated conferees to create an associated videoconference. The video of the associated conference is organized according to the type of the cascading conference being conducted. One type of conference is a video switching conference. A video switching conference is a conference in which each conferee can see only one selected participant (one source of video). During the conference, the selected conferee can be changed according to different criteria and according to the dynamic of the conference. If the cascading conference is a video switching conference, the SMCU may select one of the associated conferee's video and uses it as the video of the associated conference of the SMCU.

One selection parameter for selecting which conferee is displayed at a given time during a video switching conference can be the audio energy of conferees. For example, the conferee with the highest audio energy might be displayed. Another selection parameter is a "forced presented conferee," which is a conferee that has been defined to be presented in the video image of the conference independent of his activity. A conferee can be designated as a forced presented conferee by the moderator of the conference, an operator, as parameters in the conference profile, etc.

An alternative to video switching is a continuous presence layout. A SMCU may compose video signals of selected conferees from its associated group into a continuous presence (CP) video according to a layout of the associated conference of the SMCU. The mixed audio and the video of the associated conference are transferred in a manner similar to video and audio of a single conferee to the MMCU. A common continuous presence ("CP") process involves scaling the video data from various source user terminals to change the frame resolution in order to incorporate it later into a continuous presence layout and video mixing, thus scaled video data to be composed in the CP layout.

The MMCU can mix the audio and video received from the one or more SMCUs with the audio and video of selected conferees from the group of conferees that are associated with the MMCU. The result is a mixed audio and video of the cascading conference. Then the MMCU may deliver the mixed audio and video of the cascading conference to each one of its own associated conferees and to the connected one or more SMCUs. Each one of the one or more SMCUs can distribute the mixed audio and video of the cascading conference to their associated conferee endpoints.

One challenge in managing a common cascading conference is that each MCU (MMCU and SMCUs) selects conferees to be mixed and displayed from its associated group independent of how the selected conferees relate to conferees in the other associated groups. Also, the sizes of the images of conferees that are associated with the MMCU are often different from the images of conferees that are associated with the SMCUs. If a CP layout is used as the layout of an associated conference of a SMCU, the composed video coming from the SMCU replaces a location of a single conferee in the cascading layout. The result is that each of the conferees associated with the SMCU gets a smaller screen area (e.g., ¼ of a space normally assigned to a conferee in the layout of 2×2), as is illustrated in FIG. 1 layout 100.

Layout 100 illustrates a 2×2 layout of CP cascading conference that is composed by a MMCU. In order to fit a conferee's window in a 2×2 layout, each selected video is scaled down to a quarter of a screen. The video images of selected conferees (AM, BM, DM) that are associated with the MMCU are scaled down and are placed in windows 102, 104, and 106, respectively. The input from the SMCU, which includes a 2×2 composite layout of the video images from conferees that are associated with the SMCU (As, Cs, Ds and Es), is also scaled down by four and is placed in the top right corner of layout 100. However, the image of each one of the slave conferees (As, Cs, Ds and Es) are scaled down to quarter of a screen by the SMCU, therefore, in the layout 100 of the cascading conference, each one of the slave conferees has a smaller area than one that is used by a conferee that is associated with the MMCU, i.e., 1/16 of the screen compare to a ¼ of a screen, as illustrated by rectangles 112, 114, 116 and 118.

A common way to correct the differences in sizes of images of conferees, which are associated with an MMCU compare to the image size of conferees that are associated with a SMCU, is by forcing the SMCU to use a video-switching layout and deliver video of a single selected conferee. The image of the single selected conferee is placed in the layout of the cascading conference. Layout 120 illustrates a snapshot of a screen of 2×2 CP cascading conference in which the SMCU is forced to work in switching mode. In switching mode, the SMCU delivers an image of a single selected conferee that covers the entire frame. Therefore, when the MMCU scales the image down to place it in the CP layout of the cascading video the scaled down image has the same size as the images of conferees that are associated with the MMCU. In layout 120, windows 122, 126, and 128 are associated with conferees AM, CM, DM (respectively) that are associated with the MMCU and the window 124 is associated with conferee as that is associated with the SMCU. The four areas (windows) (122, 126, 128 and 124) have the same size. Using this method corrects the size problem but prevents viewing the other conferees that are associated with the SMCU even if their audio energy is higher than the audio energy of AM and/or BM and/or DM.

Therefore, there is a need for systems and methods for composing video for cascading conference in which each of the conferees are evaluated under the same criteria for being displayed in the layout regardless of whether the conferee is associated with the MMCU or with a SMCU.

SUMMARY OF INVENTION

A system and method are disclosed for providing continuous presence layout in a cascading conference. According to one embodiment, two or more MCUs are used to create a CP layout in a cascading videoconference. According to one embodiment, one or more cascading CP composition controller (CCCC) modules can be used. During a CP cascading conference, the CCCC determines which conferee endpoints to present in a cascading CP layout and in which window the conferees should appear. The selection can dynamically change during the conference. The CCCC receives information such as audio energy of each conferee of the cascading conference. The information can be periodically delivered automatically by each MCU that are associated with the cascading conference or may be retrieved by the CCCC from each MCU. Based on this information the CCCC determines which conferee will be displayed and in which window of the cascading CP layout the conferee is displayed. The decision is transferred to each MCU that are involved in the cascading conference.

Before beginning a cascading conference session, a setup (architecture) of the cascading conference can be defined. The setup may define which of the MCUs will act as a MMCU; the connection between the MMCU and the one or more SMCUs; the association between each conferee to an MCU (MMCU or one of the SMCUs) etc. Different methods can be used to define the setup of the cascading conference. One exemplary embodiment uses a server, referred to herein as a cascading conference server (CS), to define the setup of the cascading conference. In one embodiment, the CS is embedded within one of the MCUs. More information on exemplary cascading servers that can be used in order to setup a cascading conference are disclosed in U.S. patent application Ser. Nos. 09/708,898; 10/941,790 and 11/109,563, the content of each being incorporate herein by reference.

According to alternative exemplary embodiments, a cascading conference server is not necessary. In those embodiments, the MCUs may be adapted dynamically to select one MCU as a master and the others as slaves. In other exemplary embodiments, one MCU is pre-configured to be the MMCU and the others as SMCUs. After designating one of the MCUs as the MMCU, a CCCC can be associated with the MMCU. In one exemplary embodiment, the CCCC can be loaded to a selected MMCU from the CS. In another exemplary embodiment, one of a plurality of MCUs has a CCCC but only the CCCC that is located in the designated MMCU is activated by the CS. In an alternate embodiment, one MCU is pre-configured to be the MMCU by associating the MCU with an active CCCC.

According to some exemplary architectures, MCUs are not designated as MMCU and SMCUs; rather, all the MCUs perform essentially the same task and are referred as peers MCUs. For example, the CCCC can be installed in the CS and the CS manages the composition of the video of the cascading CP layout. In such architecture all of the MCUs work in a similar way, i.e., none of the MCUs acts as a MMCU. Alternatively, a distributed cascading architecture can be used. In a distributed architecture, each MCU involved in the cascading conference has an active CCCC.

Exemplary embodiments do not depend on the method in which the architecture of the cascading conference is defined and how the endpoints are associated with the different MCUs. Exemplary embodiments may be initiated after defining the architecture (setup) of the cascading conference and setting the multimedia connections between the MCUs and their associated endpoints and between the different MCUs and the association and activation of one or more CCCCs.

One or more cascading conference layout (CCL) can be defined. Defining the CCL can be done according to the requirement of a moderator that has requested the conference or according to any other criteria such as a profile of the conference, etc. In one exemplary embodiment, the CCL is defined by a cascading server that was involved in establishing the setup of the conference. In an alternate embodiment, the CCL is defined by the MMCU. More information about a profile of a conference or a layout of a conference is disclosed in U.S. application Ser. Nos. 09/790,577; 10/941,790; and 10/960,337, the contents of which are incorporate herein by reference. The CCL may include one window for a video switch conference or two or more windows for a CP conference. Each window will be associated with an endpoint. However, the association between the endpoint and the window may change dynamically. Different conferees may be displayed on the same window during different periods of the cascading conference. If the cascading conference is a video switching conference, then the present invention may display a selected video image in a similar way to common cascading methods. However, the selection procedure is improved since the selection is done by comparing parameters that related to all of the conferees independently on their group.

If the CCL is a CP layout, then according to one embodiment, an entity that has an active CCCC can define which windows in the CCL will be associated with each MCU. The decision may be based on several criteria or selection parameters. For example, the windows may be divided proportionally to the number of endpoints that are associated with each MCU. Alternatively, it may be defined that certain conferees must be displayed during the entire session in certain windows and the rest of the windows divided between the MCUs. Other exemplary embodiments may allocate the windows at the beginning of the session and then the association of the windows is managed by the one or more active CCCC and is changed according to the dynamic of the session. Changing the association between different conferees and the different windows can be based on criteria (i.e., selection parameters) similar to the criteria that are used in common CP conference managed by a single MCU.

An exemplary selection parameter can be the audio energy of the various conferees so that selected conferees are the conferees that are the loudest speakers at a given time. The selection can be based on the audio energy parameter that is collected by the CCCC from each MCU. The CCCC may run an audio energy table that tabulates the current audio energy of each conferee. Information on the audio energy of each conferee can be periodically sampled, for example every few tens or hundreds of milliseconds. The decision to change the layout can be based on the one or more monitoring cycles. The decision is relayed to the different MCUs that are involved in the cascading conference. In a distributed architecture in which two or more active CCCC are involved in the cascading conference, each CCCC may run a similar audio energy table and may control the one or more MCUs that are associated with that particular CCCC. Each CCCC collects the information from all the MCUs that are involved in the session.

A data and control communication link is established between the CCCC and each MCU. The data and control communication link may be based on Internet Protocol (IP) or any other type of communication protocol that can be used for communication between computers or systems. In embodiments wherein the CCCC is installed in an MCU, for example in architectures that include a MMCU, the CCCC internally communicates with the different modules of the MMCU. The data and control communication link can carry information from the different MCUs to the CCCC and carry commands from the CCCC to the MCUs. The MCU may send to the CCCC information regarding the audio energy of each one of its associated conferees or information to the conferees that their video is included in a continuous presence (CP) image of the associated conference. In some cases, the information may include the location of each conferee in the layout that is associated with the MCU (the windows in the CCL that were allocated by the CCCC to the MCU), etc.

The commands that may be sent to an MCU may include instructions regarding the layout that is associated with the MCU. The instructions may include information on the size and the location in the layout of the areas (windows) that are allocated to the conferees. The instructions can be sent once at the beginning of the conference or may be dynamically changed according to changes in the cascading conference. For example, the number of windows in the CCL that are allocated to a certain MCU may increase if the number of speakers that speak louder than the conferees of the other one or more MCUs increases.

During the conference, each of the MCUs composes the video coming from its associated conferees by selecting appropriate one or more video sources (conferees) according to the instructions received from the relevant CCCC and scaling the video sources to fit the size of the windows that are allocated to the MCU. The MCU creates a composed associated CP video data stream wherein the video of its selected conferees is placed in the windows that have been allocated to the MCU and the unallocated section of the layout (i.e., the section allocated to other MCUs) can be a background color or a transparent color (a blue filter color, for example). A transparent color may be defined by the CCCC. In an architecture in which a MMCU is used, the MMCU receives the associated CP video from each of the SMCUs over a multimedia connection. In a distributed architecture or an architecture wherein the CCCC is installed in a CS, each of the MCUs that are involved in the cascading conference has a multimedia connection with the other MCUs. The multimedia connection between the MCUs is used to transfer the composed associated CP video data of each of the MCUs to each of the others.

During composing the video of the cascading conference in order to deliver the CCL to its associated endpoints, each MCU selects the appropriate video data from the MCU's associated endpoints according to the instructions received from the relevant CCCC. Each video data stream is scaled to the appropriate size and placed in the appropriate windows in the CCL allocated to that particular MCU. Composed associated CP video data received from the one or more other MCUs is scaled to fit the CCL, if scaling is needed. During placing the composed associated CP video data, pixels having a transparent indication (color) are discarded and the remaining pixels are placed in the location in the cascading layout corresponding to their location in the received composed associated CP video.

Alternatively, a composed associated CP video data stream is not used, but rather each MCU delivers a plurality of video frames. Each video frame can include an image of a selected conferee according to the instruction of the CCCC. The image can be scaled to an appropriate size according to size of its associated window in the CCL and the rest of the frame can include a transparent color or a background color. Each video frame can be sent over a video channel on a single multimedia connection line. Sending each frame is done in a way similar to the one that is depicted in communication standard such as ITU standard H.239.

Alternatively, each MCU may select number of conferees up to the maximum number of conferees that can be placed in the CCL. For example, if the CCL is 2×2, each MCU may select up to four of the loudest conferees and delivers their images with the audio energy to the other MCUs. Each MCU may select relevant images according to the instructions coming from the one or more CCCCs. In yet an alternate embodiment, each MCU may decide which image to present according to audio energy that is associated with the image, for example.

A signaling and control connection may be used instead of using a "blue color filter." The signaling and control connection may inform the other MCUs about the coordinates of each window in the composed associated CP video data. The coordinates can be the XY coordinates of the top left and bottom right corners of each image, for example. The signaling and control connection between the different MCUs can be out of band, for example, a connection that uses an Internet protocol. In an alternate embodiment, the connection can be in-band. For example, in the case of using compression standard H.264, a Supplementary Enhanced Information (SEI) packet can be used. The SEI packet attached to each frame can be used to carry signaling and control information. In the case of using H.263 as the compression standard, one or more Picture Supplemental Enhancement Information (PSUPP) fields in the frame header can be modified in order to carry the coordinates of each window. In another exemplary embodiment, the signaling and control connection may be used also for carrying information on the audio energy of the conferee that is currently associated with the window.

More information on how an MCU receives, decodes, scales, composes two or more decoded streams, composes decoded streams into one or more composite video of a CP conference is disclose in U.S. Pat. Nos. 6,300,973; 6,496,216; and 6,757,005 and in U.S. patent application Ser. Nos. 10/344,792 and 10/346,306, the contents of which are incorporate herein by reference.

BRIEF DESCRIPTION OF DRAWINGS

Exemplary embodiments will be more readily understood from reading the following description and by reference to the accompanying drawings, in which.

DESCRIPTION OF EMBODIMENTS

Figure 1:
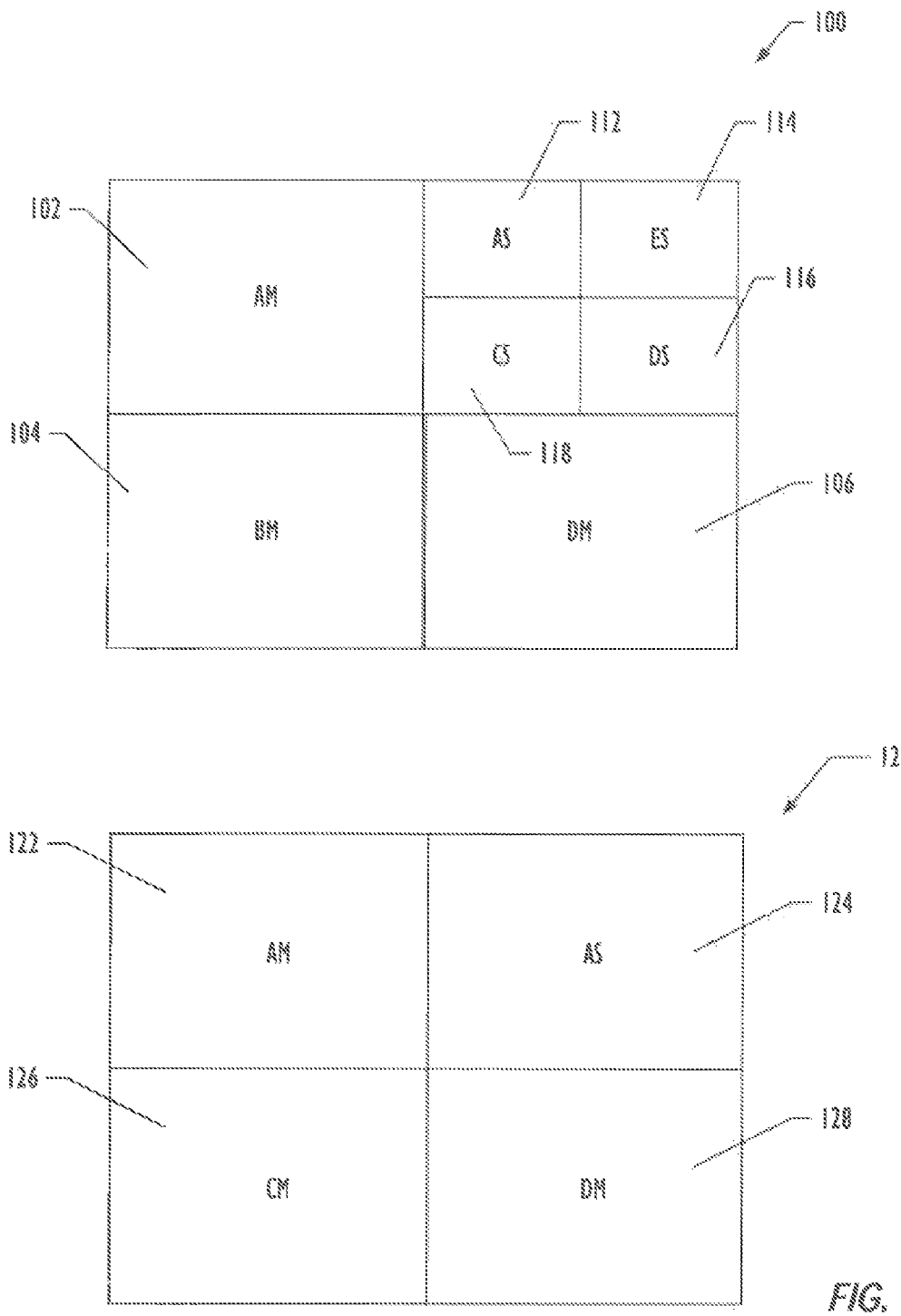
FIG. 1 illustrates different layouts of a prior art cascading conference.
Figure 2:
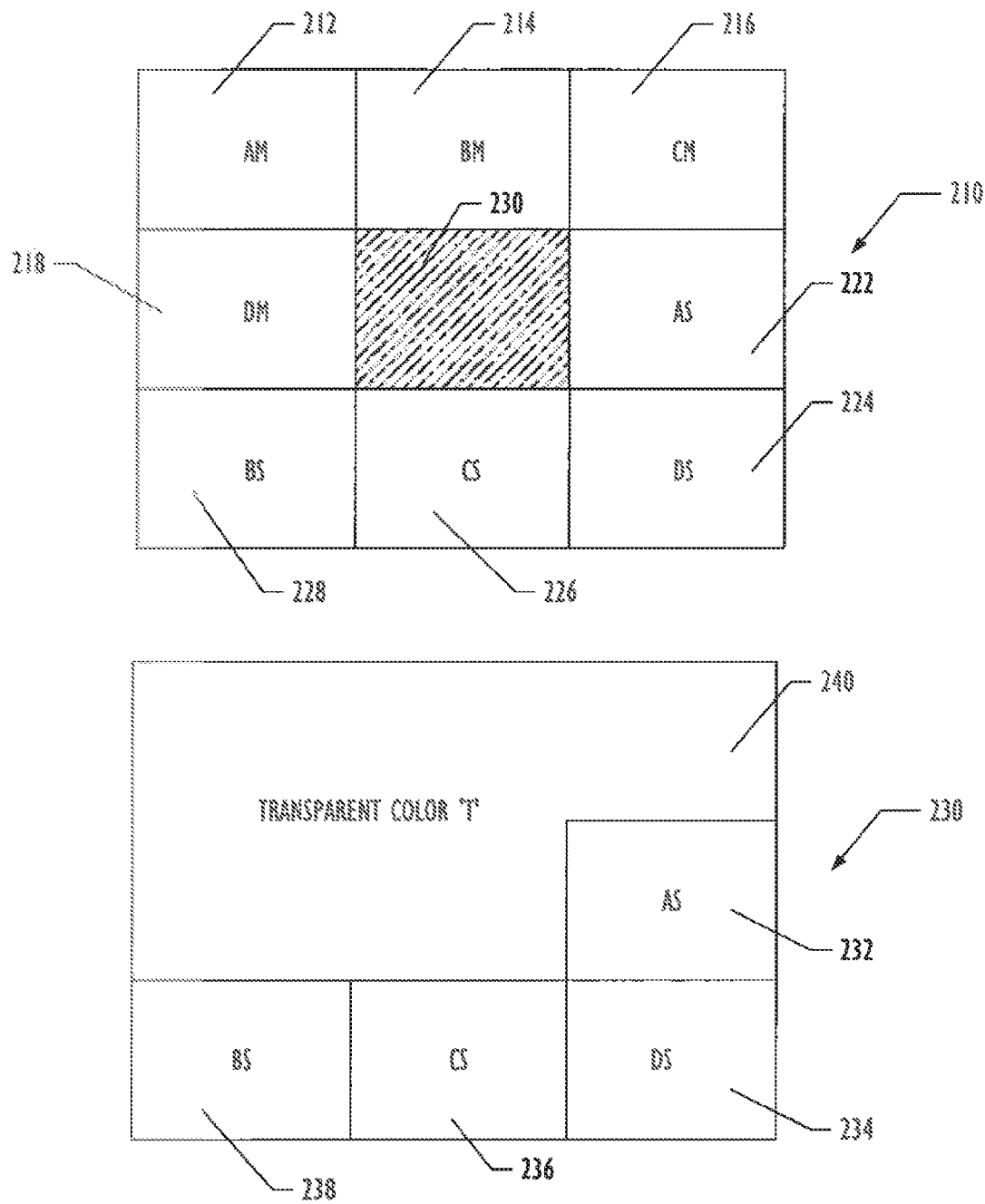
FIG. 2 illustrates exemplary CP cascading layouts.

FIG. 2 illustrates an exemplary cascading conference layout (CCL) having 8 conferees and two MCUs. Each MCU is associated with four endpoints. An exemplary cascading conference layout CCL 210 may include nine windows that are divided into two groups of four windows each. Each group is associated with an MCU. The first group is associated with a MMCU (the MCU that includes an active CCCC) and includes windows 212, 214, 216 and 218, which are currently occupied by the video image of conferees AM, BM, CM and DM respectively. The second group of windows is associated with the other MCU, the SMCU, and includes windows 222, 224, 226, and 228, which are currently occupied by the images of conferees As, Ds, Cs, and Bs, respectively. The unoccupied window 229 may be used to display data, information on the conference, a menu, a slide, a background color, etc.

Layout 230 illustrates a composed associated CP video data that is created and sent by the SMCU. Each selected conferee As, Bs, Cs, and Ds are located at the final location 232, 234, 236, and 238, respectively, and a transparent color or a background color 240 is placed over the rest of the layout.

In another exemplary embodiment, several video frames are sent instead of composed associated CP video data stream. Each frame may include a single window in the appropriate size. The window may be placed in the final location (232, 234, 236, and 238 respectively) or each frame may include the window in a certain corner of the frame, the top left for example. The rest of the frame can include a transparent color. Yet in an alternate embodiment, each conferee's frame can be in a size that matches the relevant window without adding an empty area with background color.

According to another embodiment, each MCU processes its composed associated CP video data or the plurality of video frames in such a way that the other MCUs may not need to decoded the received composed associated CP video data or the plurality of video frames. Instead, the compressed frames (windows) can be used to create the CCL. When H.264 or H.263 annex K is used as compression protocol, slice mode can be used and each selected conferee presented in a slice. Composing the video of a CCL may only require joining the appropriate slices. An exemplary method may use the composition method that is discloses in U.S. patent application Ser. No. 10/761,718, the contents of which are incorporated herein by reference.

Figure 3:
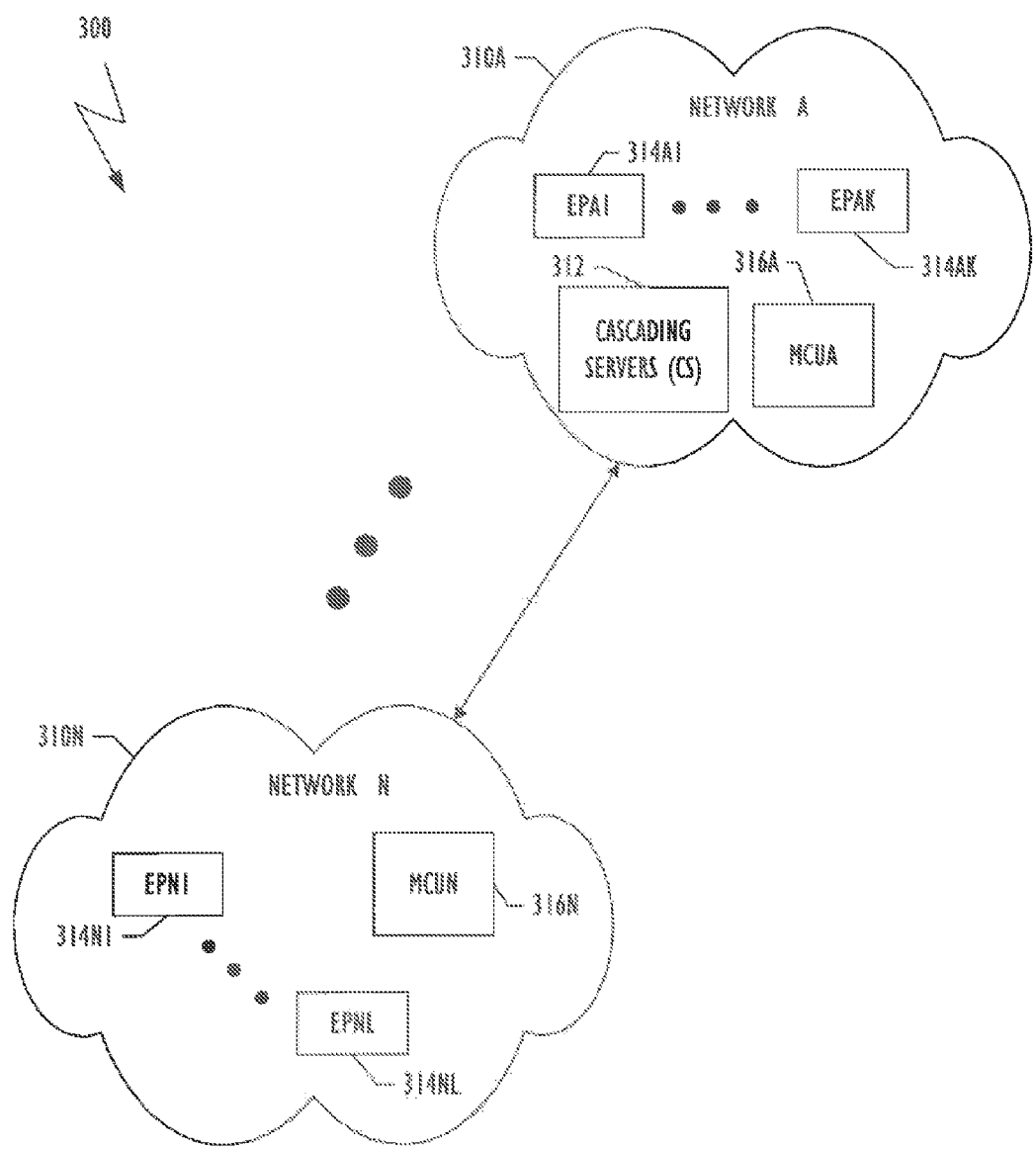
FIG. 3 illustrates a multimedia communication environment.

FIG. 3 is a block diagram illustrating a conferencing communication system 300. The sites or zones 310a-n may communicate with each other via packet-switched connection and/or circuit switched connection. Each site 310a-n has a plurality of multimedia endpoints 314 and one or more local or site-specific multipoint control units (MCUs) 316. One or more cascading servers (CS) 312 can be located at one site 310a-n, located at more than one site 310a-n, or located elsewhere in the system 300.

In an exemplary embodiment of FIG. 3, one CS 312 is used in site 310a. Within each site 310a-n, each of the local endpoints 314 communicates with its associated MCU 316 via its local network 310a-n that can be a packet-switched network and/or circuit switched network. Those skilled in the art will appreciate that the specific number of sites 310a-n, endpoints 314, MCUs 316, and CS 312 shown in FIG. 3 is only exemplary and is illustrated for convenience of presentation.

In one embodiment of the disclosed system 300, the CS 312 is a web server that can communicate with each local MCU 316 over an IP network using Internet Protocol (IP). MCU 316 can be communicated with via an application program interface (API) module (not shown), which is part of the MCU 316. CS 312 can be a dedicated server for performing cascading of multi-site conferences or can be embedded in MCU 316, or may comprise applications sharing a single web server. For example, the web server can perform additional conferencing applications and can be used for managing reservation calls, ad-hoc calls, virtual meeting room, monitor and control the MCUs ("Web-Commander"), etc., as disclosed in the above-incorporated patents and patent application references.

System 300 can comprise one or more cascading CP composition controller (CCCC) for managing the composition of different windows in one or more CP layouts of a cascading conference. In one exemplary embodiment, a CCCC resides within the CS 312. In an alternate embodiment, a CCCC can be associated with one or more of the MCUs 316a-n. In one embodiment of system 300, only one CCCC is active during a cascading conference. In another embodiment of system 300, a plurality of CCCCs can be active simultaneously to manage the cascading conference in a distributed architecture. More information on the operation of exemplary CCCC is described above and is disclosed below in conjunction with FIGS. 4a & b, 6, and 7.

Figure 4A:
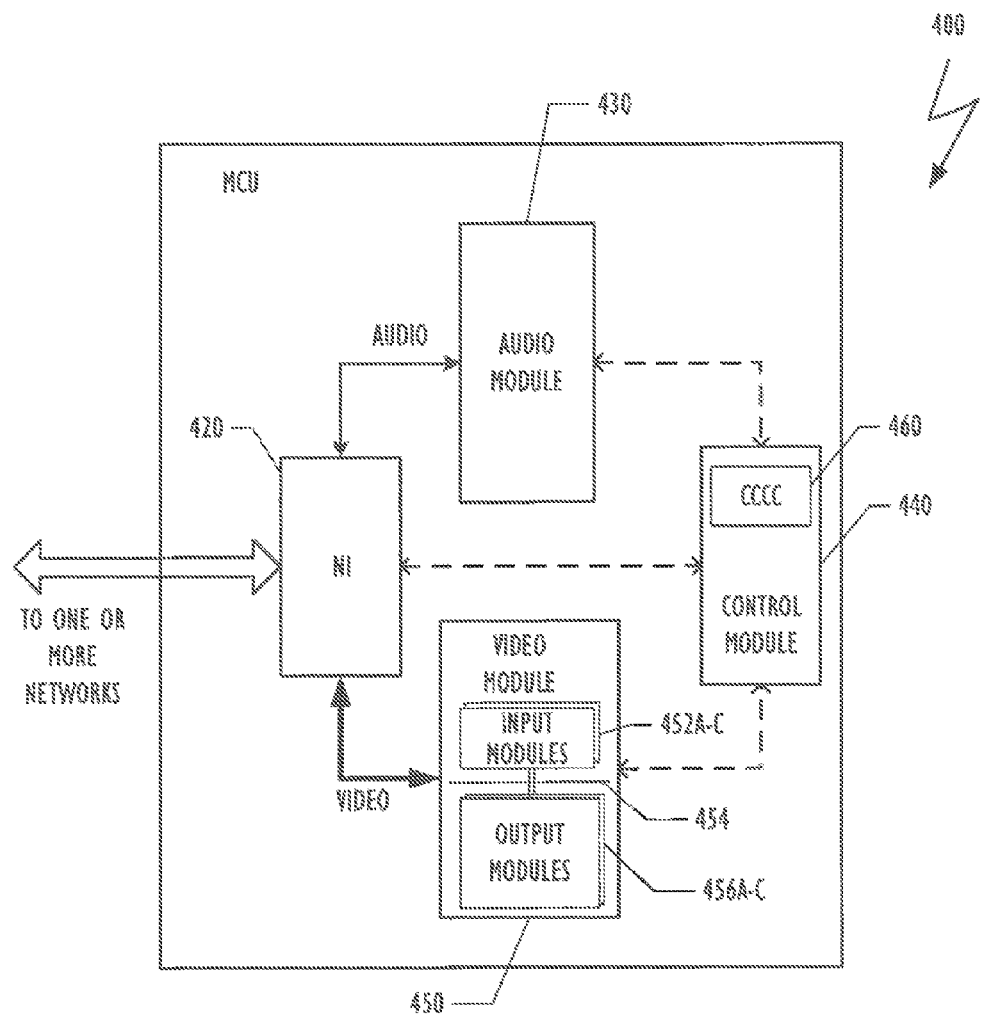
FIG. 4a is a simple block diagram with elements of a MCU.

FIG. 4a is a simplified block diagram of exemplary MCU 400 that can be used for conducting multimedia cascading conference having one or more CP layouts. MCU 400 may comprise a network interface 420, an audio module 430, a control module 440, and a video module 450. The network interface (NI) 420 receives the communication from the endpoints 314 (FIG. 3) via the relevant networks 310a-n (FIG. 3) and processes the communication according to variety of communication standards. Furthermore, network interface 420 can be used for receiving and transmitting control and data information from and to the other MCUs 316a-n and/or the one or more CS 312 (FIG. 3). More information concerning communications between endpoints and/or MCUs over different networks and information describing signaling, control, compression, and how to set a video call, for example, can be found in the International Telecommunication Union ("ITU") standards H.320, H.321, H.323, H.261, H.263 and H.264.

Video module 450 receives compressed video from the plurality endpoints that are associated with the MCU 400 via NI 420. Furthermore, the video module 450 may receive and/or may create one or more associated CP layouts from/to the other MCUs that are involved in the cascading conference. The video input is processed, composed, and encoded by the video module. An exemplary video module 450 can have a plurality of input modules 452a-c, output modules 456a-c, and a common interface 454. Some of the input modules 452a-c as well as output modules 456a-c can be associated with endpoints and some of the input modules 452a-c as well as output modules 456a-c can be associated with other MCUs. During a cascading conference, a set of an input module 452 and an output module 456 can be associated with other MCU that is involved in the cascading conference.

The number of sets that are associated with the MCUs depends on the architecture of the conference. For example, in case of using master/slave architecture, one of the MCUs is appointed as the MMCU and one or more MCUs are appointed as SMCU. In this example, the MMCU includes an exemplary CCCC 460. The MMCU may have one set of input/output modules 452/456 per each of the SMCUs. Each of the SMCU has one set of input/output modules 452/456 that is associated with the MMCU. In a distributed configuration in which each MCU has an active CCCC 460, or in a configuration in which the CS 312a (FIG. 3) has the active CCCC, each MCU has a plurality of sets of input and output modules (452&456), one set per each MCU that is associated with the cascading conference. In an alternate embodiment, a single output module may transmit its composed associated CP to two or more MCUs.

Common functionality of the various components of video module 450 is known in the art and is not described in exhaustive detail herein. However, the reader desiring a better understanding of such details may wish to consult U.S. patent application Ser. No. 10/144,561; U.S. Pat. No. 6,300,973; and International Application Serial No. PCT/IL01/00757, the contents of which are incorporated herein by reference. The present disclosure describes the operation of the video module 450 in preparing a cascading CP layout below in conjunction with FIG. 5 and FIG. 7.

Audio module 430 receives, via the audio line, the compressed audio streams of the plurality of endpoints 314 (FIG. 3) via NI 420. Subsequently, the audio module 430 processes the compressed audio streams, may mix the relevant audio streams (originating from the endpoints 314), and sends the compressed mixed signal via the audio line back to NI 420, and from there to endpoints 314. In one embodiment, the audio streams that are sent to each of the endpoints 314 may be different. For example, the audio streams sent to different ones of the endpoints 314 may be formatted according to different communications standards, according to the needs of the individual endpoints 314. Also, as another example, the audio stream may not include the voice of a user associated with the endpoint 314 to which the audio stream is sent, but that voice may be included in all other audio streams.

A common audio module 430 is adapted to analyze the received audio signals from the endpoints and determine the audio signal energy of each endpoint. Information on the signal energy can be transferred to the control module 440. The energy level can be used as a selection parameter for selecting the appropriate one or more endpoints as the source for the mixing of the audio and/or the video of the conference, referred as "presented endpoints."

The control module 440 may be a logic unit that controls the operation of the MCU 400. In addition to common operations of a typical MCU, MCU 400 is capable of additional operations as result of having control module 440. Specifically, the control module 440 may include logic module for controlling the composition of a CP layout of cascading conference, a CCCC 460. CCCC 460 can process information from the other MCUs that are involved in the cascading conference, as well as information from the endpoints that are associated with MCU 400. The information can be used for determining which endpoint will be selected to be display in the CP layout of the cascading conference. An exemplary type of information can be the audio signal energy of each endpoint. Some unique operations of the control module 440 and more particularly of the CCCC 460 are described in detail below with respect to FIGS. 4b and 6.

Figure 4B:
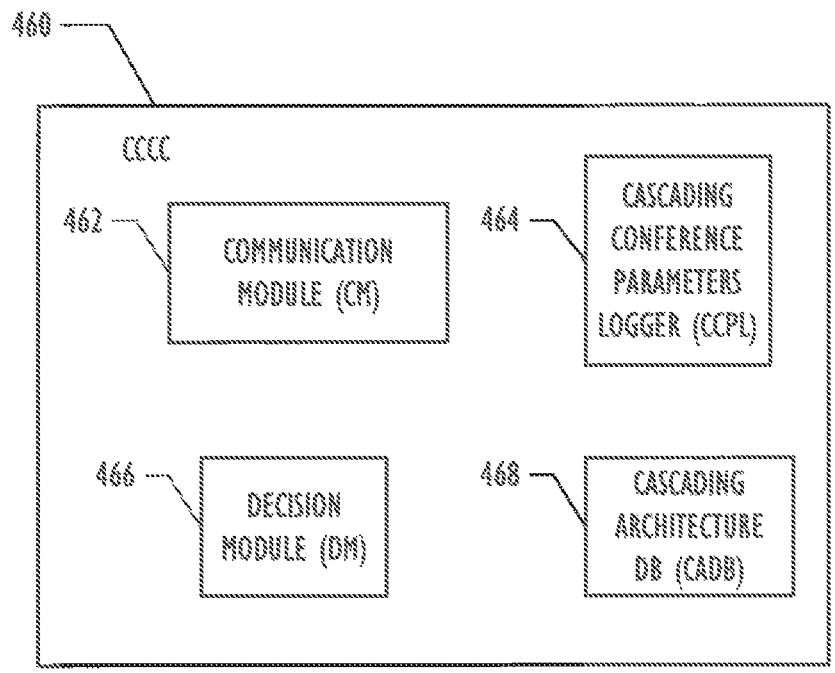
FIG. 4b is a simple block diagram illustrating a CCCC.

Referring now to FIG. 4b an active logical module CCCC 460 can be a section of a control module 440 of one or more MCUs that are associated with a cascading conference or a section of a CS 312 (FIG. 3), depending on the architecture of the conferencing system 300 (FIG. 3). In case of master/slave architecture, the active CCCC 460 may be a part of the control module 440 of the MMCU. According to some embodiments, the SMCUs may not have a CCCC. In a distributed architecture, each MCU has an active CCCC 460 as a part of its control module 440. In a configuration in which the CS 312 controls the composition of the cascading CP, the CCCC 460 can be a section of the CS 312 and none of the MCUs need have an active CCCC 460. If two or more cascading conferences are conducted simultaneously over communication system 300, each cascading conference may be associated with a different CCCC 460. Those CCCC 460 can reside in different entities or in the same entity, for example in case that two cascading conferences are controlled by two different MMCUS.

Among other elements, an exemplary CCCC 460 can include a communication module (CM) 462, a cascading conference parameters logger (CCPL) 464, a decision module (DM) 466 and a cascading architecture database (CADB) 468. Via CM 462 CCCC 460 communicates with each MCU 316a-n that are involved in the cascading conference and with CS 312 (FIG. 3) if is exist. CCCC 460 may receive via CM 462 information (parameters) associated with the composition of the one or more cascading CP layouts. The information can be collected from the different MCUs. The parameters can include audio energy of the different conferees that are associated with a certain MCU and the location of the windows of each conferee in the composed associated CP video that is generated by the MCU. In one exemplary embodiment, information from the different MCUs can be collected periodically by the CCCC 460. In an alternate embodiment, sending the information may be initiated by an MCU upon detecting a change in one of the parameters, for example.

CCCC 460 may send instructions via CM 462 to each MCU involved in the cascading session. The instruction can include selection instructions as to which conferees will be selected such that their images will be composed in a composed associated CP video that is created by the MCU, the location of the selected conferees' windows in the composed associated CP, audio of which endpoint to be mix, etc. CM 462 receives from CS 312 (FIG. 3) instructions as to the architecture, the MCUs, and the endpoints that are involved in the session, etc. and sends to CS 312 status information on the cascading conference to the CS 312.

Communication with the CS 312 (FIG. 3) can be over a packet-based network such as but not limited to LAN, Internet, Intranet, etc. or any other type of network that is used for communication between computers. Communication with the different MCUs can be out of band, for example, via an IP connection with each of the MCUs. Alternatively, the connection can be in-band. For example, in case of using compression standard H.264 annex D, a supplementary enhanced information (SEI) packet, which is attached to each frame, can be used. In case of using H.263 as the compression standard, one or more PSUPP fields in the frame header can be used in order to carry the coordinates of each window. The communication between CM 462 with the MCUs and the CS can be via NI 420 (FIG. 4a) or directly from CM 462 to the network.

CCPL 464 is the module in which dynamic parameters of the cascading conference and its associated endpoints and MCUs are stored. An exemplary CCPL can be a cyclic data structure that is organized in sampling periods and may include the last 'K' periods, wherein 'K' is the range of one to a few tens of periods. Each periodic section can include information on audio energy of each of the conferees, location information of their associated windows, whether their image is included in the current one or more composed associated CP layouts, etc. The sampling periods can be in the range of few tens of milliseconds to few seconds, for example. In one exemplary embodiment, sampling the parameters from the different MCUs can be managed by the CCPL 464 and run in parallel to the activity of the CCCC 460. In an alternate embodiment the CCPL 464 may be managed by DM 466.

CADB 468 is a database for storing information related to each of the endpoints and MCUs in the cascading conference. The information can include the associations between the endpoints and the MCUs and the associations between the different MCUs for the current cascading conference. Information related to the different cascading layouts that can be requested by the endpoints and the selecting rules for selecting the appropriate endpoint can also be stored. Information about the architecture can be received from the CS 312. Furthermore, the CADB 468 can include dynamic information on the current layouts such as but not limited to which endpoints are currently connected, when a new endpoint is joining or leaving the conference, etc. This information can be delivered from the relevant MCUs.

DM 466 manages the composition of the different cascading conference layouts (CCL) involved in the current cascading CP conference, by the different MCUs. Based on conference parameters that are stored in the CCPL 464 and the layout requirements that are stored in CADB 468, DM 466 may determine which endpoint has to be mixed in each CCL, and in what window its video image is to be placed. Selecting the endpoint may be based on the audio signal energy that is associated with the endpoint. The one or more loudest speakers among the entire conferees of the cascading CP conference can be selected as presented endpoints. In order to eliminate frequent changes of video image of presented endpoints, DM 464 may collect parameters from 'J' sampling periods that are stored in CCPL 464 and may select participants that are frequently louder than the others. Those conferees will be appointed as the current presented endpoints although they are not the louder speakers in the last one or two sampling periods. The value of 'J' can be smaller or equal to 'K'. Other exemplary methods for selecting presented endpoints can be used by embodiments of the present invention.

After selecting the presented endpoints that will be displayed, the current mixing of each cascading conference layout is checked and a decision is made whether a change in the mixing of one or more MCU is needed. If not, the DM 466 may wait for the next iteration. If a change in the mixing of the video is needed DM 466 may determine which MCU is involved in the current change and in which window in the CCL to place the video image of the new one or more endpoints. The appropriate instructions are sent to the relevant MCUs, i.e., the ones that are connected to the relevant endpoints. When the required changes are executed, DM 466 may wait for the next iteration. More information on the operation of CCCC 460 is depicted below in conjunction with FIGS. 6 and 7.

Figure 5:
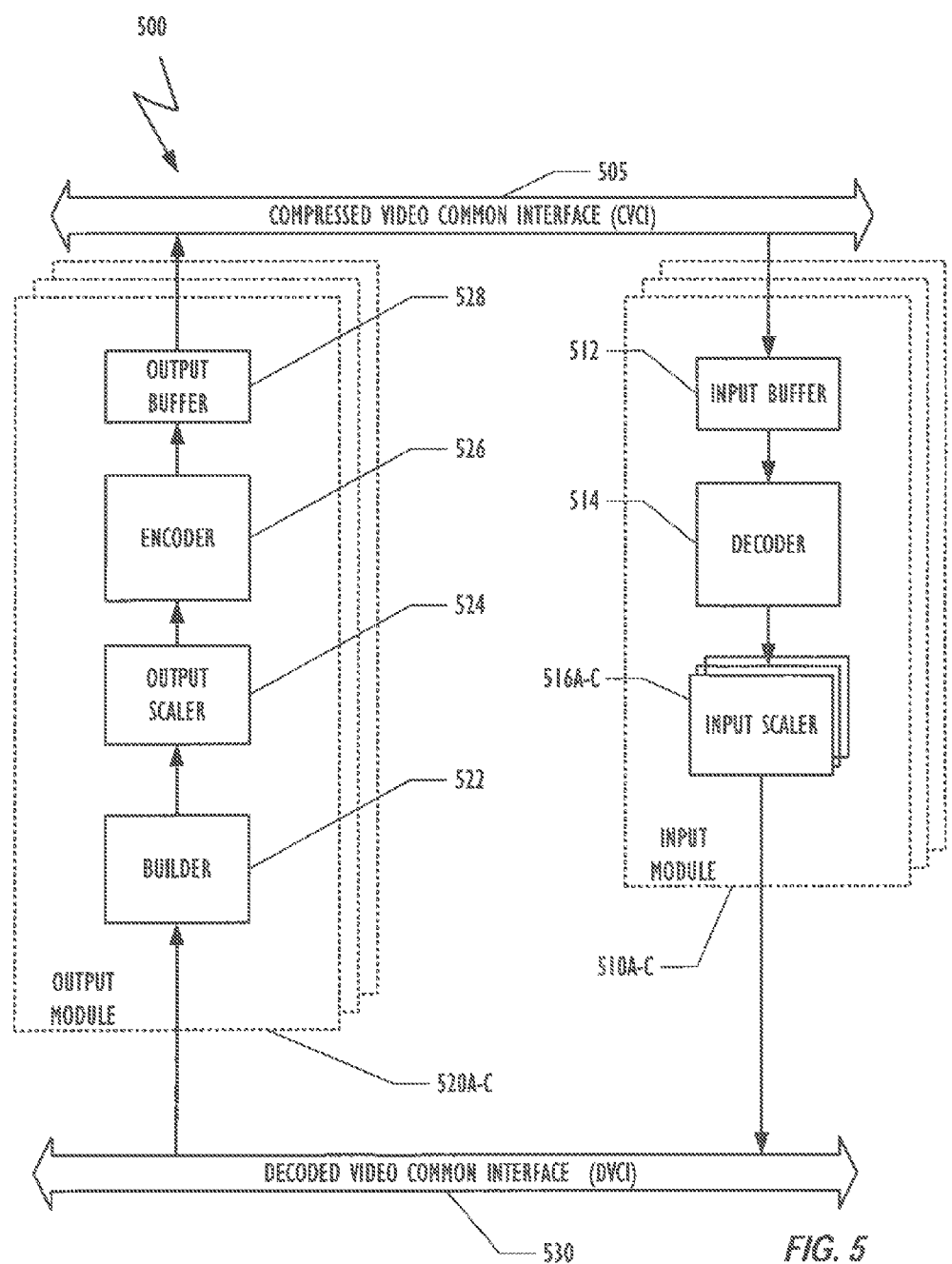
FIG. 5 is a simple block diagram illustrating elements of a video module of an MCU.

FIG. 5 is a block diagram showing the logical elements of an exemplary video module 500 within an MCU. The video module 500 processes and prepares compressed video images for transmission to endpoints and other MCUs. An exemplary video module 500 can include a compressed video common interface (CVCI) 505; a plurality of input modules 510a-c; a plurality of output modules 520a-c; and a decoded video common interface (DVCI) 530. Each input module 510a-c can include an input buffer 512, a decoder 514, and one or more input scalers 516a-c. Each output module 520a-c can include a builder 522; an output scaler 524; an encoder 526; and an output buffer 528. Three units of input modules 510a-c, scaler 516a-c and output module 520a-c are shown in FIG. 5 by way of example. It is understood that the disclosed system and method can be used with any number of modules. In addition, it is understood that other video units within a MCU may have a different configuration than that schematically shown and described here.

A plurality of terminals endpoints and/or MCUs is connected over one or more communication networks to the MCU. The terminals send their compressed video streams to the appropriate input modules 510a-c via network interface modules 420 (FIG. 4) and the CVCI 505. Also, the terminals receive the compressed video streams from the appropriate output modules 520a-c via the Network Interface Modules and CVCI 505. CVCI 505 routes the compressed video streams between the input modules 510a-c, output modules 520a-c, and the network interface modules. The CVCI 505 can be a TDM bus, packet based bus (such as an ATM bus, IP bus), serial bus, parallel bus, connection switching, shared memory, direct connection, or any variety of these. The operation of the video unit 500 is controlled by control module 440 (FIG. 4).

Each input module 510a-c and/or output module 520a-c can be a logical unit, a hardware module, a firmware module, a software module, or any combination of these. Each module 510a-c, 520a-c can be a permanent logical module or a temporary one, which is generated by the control module according to current needs. The number of the input modules 510a-c that may be associated with a cascading video conference in one MCU can be a fixed number or can be varied according to the needs of the video conference. For example, a cascading videoconference may need one input module 510 for each of the endpoints that are associated with the relevant MCU. In another video conference, one input module 510 can be used for each currently visible participant in one or more relevant associated composite CP that is produced by the relevant MCU. Furthermore, an input module 510 can be assigned to each of the MCUs that participate in the current cascading conference and that are connected to the relevant MCU.

Each videoconference can be associated with one or more output modules 520a-c. In an exemplary embodiment of the disclosed system, one output module 520 is used for each of the endpoints participating in the videoconference. In an alternative embodiment, one output module 520 can be used for each type of CCL, and each output module 520 can transfer its output to the endpoints that are using the particular CCL. Allocation of the output modules 520 can depend on various parameters known in the art, including but not limited to bit rate, frame rate, and coding algorithm, for example. Furthermore, an output module 520 can be assigned to each of the MCUs that participate in the current cascading conference and that are connected to the relevant MCU.

Once a compressed input video stream from a terminal associated with a certain input module 510 is placed onto the CVCI 505, the input video stream begins to accumulate in the input buffer 512 according to the type of the CVCI 505. For example, if the CVCI 505 is a TDM bus, then the buffer 512 grabs the appropriate input stream by sampling the CVCI 505 at the time slot assigned to the terminals associated with the input module 510. However, the buffer 512 may not be necessary, and other embodiments of the disclosed system may accumulate the appropriate compressed input stream by other techniques known in the art.

Decoder 514 grabs the received compressed video stream from input buffer 512. Based on the encoding standards (H.261, H.263, H.264, etc.) of the compressed video stream decoder 514 decodes the compressed video stream into an uncompressed video, which can then be represented in the image (spatial) domain. In an exemplary embodiment in which in-band method is used for carrying control and signaling communication between MCUs, the decoder may have additional functionality. The decoder may decode the SEI packet for an H.264 annex D standard; or in case of using H.263 as the compression standard, the decoders decode the one or more PSUPP fields in the frame header.

The in-band information may include location parameters of the window associated with the relevant endpoint in the CCL. The location parameters can be coordinates of the top left and bottom right corners of the window or one coordinate and two dimensions, for example. In exemplary embodiment of the present invention in which each MCU (master or slave) selects the endpoints that will be displayed on the screen of its associated endpoints, audio energy indication can be added to the in-band information. After decoding the in-band information, the decoded location information and the audio information can be transferred to the control module 440 (FIG. 4a). In exemplary embodiments in which the location information and/or audio energy is sent out-of-band, the decoder 514 is not involved in controlling the building of the CCL.

The output from the decoder 514 is transferred from the decoder 514 to one or more input scalers 516a-c. The number of input scalers 516a-c can depend on the number of different segment sizes to which the uncompressed video is assigned in the different CCLs of the conference. The scaling performed by the input scalers 516a-c changes the resolution of the uncompressed video according to the requirements of the endpoints and/or according to the size of the associated segments. The input scalers 516a-c can also perform known filter operations on the scaled, uncompressed video to preserve the picture quality. The output of the input scalers 516a-c is transferred to the decoded video common interface (DVCI) 530. The input scalers 516a-c can be connected to the DVCI 530 via a buffer (not shown). In an alternative embodiment of the disclosed system, the input modules 510a-c may not include input scalers 516. Instead, the decoded stream from the decoder 514 can be transferred directly or via a buffer (not shown) to the DVCI 530. The builder 522 on the output module 520a-c can then perform the various functions of the input scalers 516.

The uncompressed video can be transferred according to the type of DVCI. For example, if the DVCI 530 is a TDM bus, then a decoded stream from an input scaler 516a-c can be transferred to the DVCI 530 during a time slot associated with the particular decoded stream. DVCI 530 routes the decoded video between the input modules 510a-c and the output modules 520a-c. DVCI 530 can be a TDM bus, packet-based bus, serial bus, parallel bus, connection switching, shared memory, direct connection, or any variety of these. In alternative embodiments, the disclosed system can use the CVCI 505 for the same functions as the DVCI 530.

The MCU can be a MMCU or a peer MCU in a distributed architecture or architecture in which CS 312 (FIG. 3) includes the CCCC and controls the composing of the CCL. The builder 522 on the appropriate one or more output modules 520a-c retrieves one or more scaled decoded video (uncompressed video) segments from the DVCI 530. The selection of the decoded video segments is based on the layout needed to be generated by the output module 520. For example, in an exemplary embodiment of a SMCU, builder 522 that belongs to an output port 520, which is associated with the MMCU, collects the scaled decoded video that were created by one or more conferees that have been appointed by the CCCC as the presented endpoint group of the SMCU. In an alternate exemplary embodiment of a SMCU, the builder 522 may collect the video that is generated by the loudest speakers among its associated conferees. Depending on the embodiment of the present invention builder 522 arranges the decoded video data of each selected conferee.

In an exemplary embodiment of the present invention in which composed associated CP video data is produced by a SMCU, builder 522 arranges the decoded video data of each selected conferee according to the location of its window in the CCL (based on information that is received from the CCCC) and creates a composed associated frame. The rest of the frame can be filled with a transparent color or a background color (blue filter, for example). In an alternate embodiment, builder 522 may create a plurality of frames; each frame can be associated with a selected conferee. Each frame can include the window with the scaled decoded video data of the selected conferee and the rest of the frame can be a background color. In one embodiment of the present invention, in each frame of a selected conferee the window of his image is located in a fixed location, top left corner for example. The rest of the frame can be filled with background color. In yet another alternate embodiment, each frame can be in the size of the window of its associate conferee and includes only the image of the appropriate conferee without background color.

In another exemplary embodiment, builder 522 may compose a number of conferees up to the maximum number of conferees that can be placed in the CCL. For example, if the CCL is 2×2, builder 522 may compose up to four loudest conferees from its associated group of conferees and place their video data in the composed associated frame or in a plurality of frames depending on the embodiment. Information on the audio energy of each selected conferee can be associated with the relevant window or frame. The information can be sent in-band or out-of-band to the other MCUs. An MCU that is associated with the relevant output module receives the composed video with the plurality of images or the plurality of frames of a single image, each with the audio energy of each selected conferee. The received MCU may locally decide which conferee's image to present according to audio energy associated with the image and indications collected from its own audio modules 430 (FIG. 4a) about the audio energy of its associated conferees.

After creating the composite frame of a CCL or a composed associated CP frame, or a plurality of frames (depending on the current embodiment), the output of builder 522 is transferred to output scaler 524 (if it exist). The output scaler 524 then scales the video image to the desired resolution and transfers the scaled video image to the encoder 526. In some exemplary embodiments, builder 522 may perform the scaling functionality and output scaler 524 is eliminated.

Encoder 526 receives the scaled composed associated CP frame or a plurality of frames from the output scaler 524 or builder 522. The encoder 526 encodes the scaled composed associated CP frame or the plurality of frames according to the compression algorithm used by the MCU that is associated with the relevant output module 520. Exemplary compression algorithm can be H.261, H.263, H.264, etc., which are known in the art and not discussed herein. In exemplary embodiments, in which in-band signaling and control information is needed, encoder 526 may add this information according to the used compression algorithm.

The signaling and control can include information on the audio energy of each selected conferee and/or its location in the frame or its associated frame from the plurality of frame. For example, in case of using compression standard H.264 annex D, a supplementary enhanced information (SEI) packet, which is attached to each frame, can be used to carry this information. In case of using H.263 as the compression standard, one or more PSUPP fields in the frame header can be used. The compressed video stream of the image is then transferred via the output buffer 528, the CVCI 505, and one or more network interface modules (not shown) to the appropriate MCU (not shown). In case several frames are used, a method such as disclosed in a communication standard ITU standard such as H.239 can be used for transferring a several video channels over a single connection line. In an alternate exemplary embodiment of the present invention in which H.263 annex C is used as compression standard, encoder 526 can be configured to modify the continues presence multipart (CPM) field in the frame header to define each conferee's frame.

In an exemplary output port 520 that is associated with an endpoint, the builder 522 can collect decoded scaled video data streams from DVCI 530 the scaled video data being created by endpoints associated with selected conferees, which in turn are associated with the MCU. In addition, the builder may collect decoded scaled data of an associated composed frame that was composed by one or more other MCUs, a MMCU, SMCU or a peer MCU depending on the architecture of the cascading system 300 (FIG. 3). The decoded scaled data of an associated composed frame can include pixels having transparent color (background color). When builder 522 generates a frame of the relevant CCL it ignores pixels that belongs to an associated composed frame pixels and has transparent color. In an exemplary embodiment of the present invention in which a transparent color is not used, (for example, when a plurality of video frames are used) builder 522 can be informed by the active CCCC via the locale control module 440 how to collect the relevant images that have been produced by the other one or more MCUs and where to place them in the layout.

Scaler 524, encoder 526 and buffer 528 of the output port 520, which is associated with an endpoint, can operate in a similar way to a common output port of an MCU and need not be discussed in more detail here.

Figure 6:
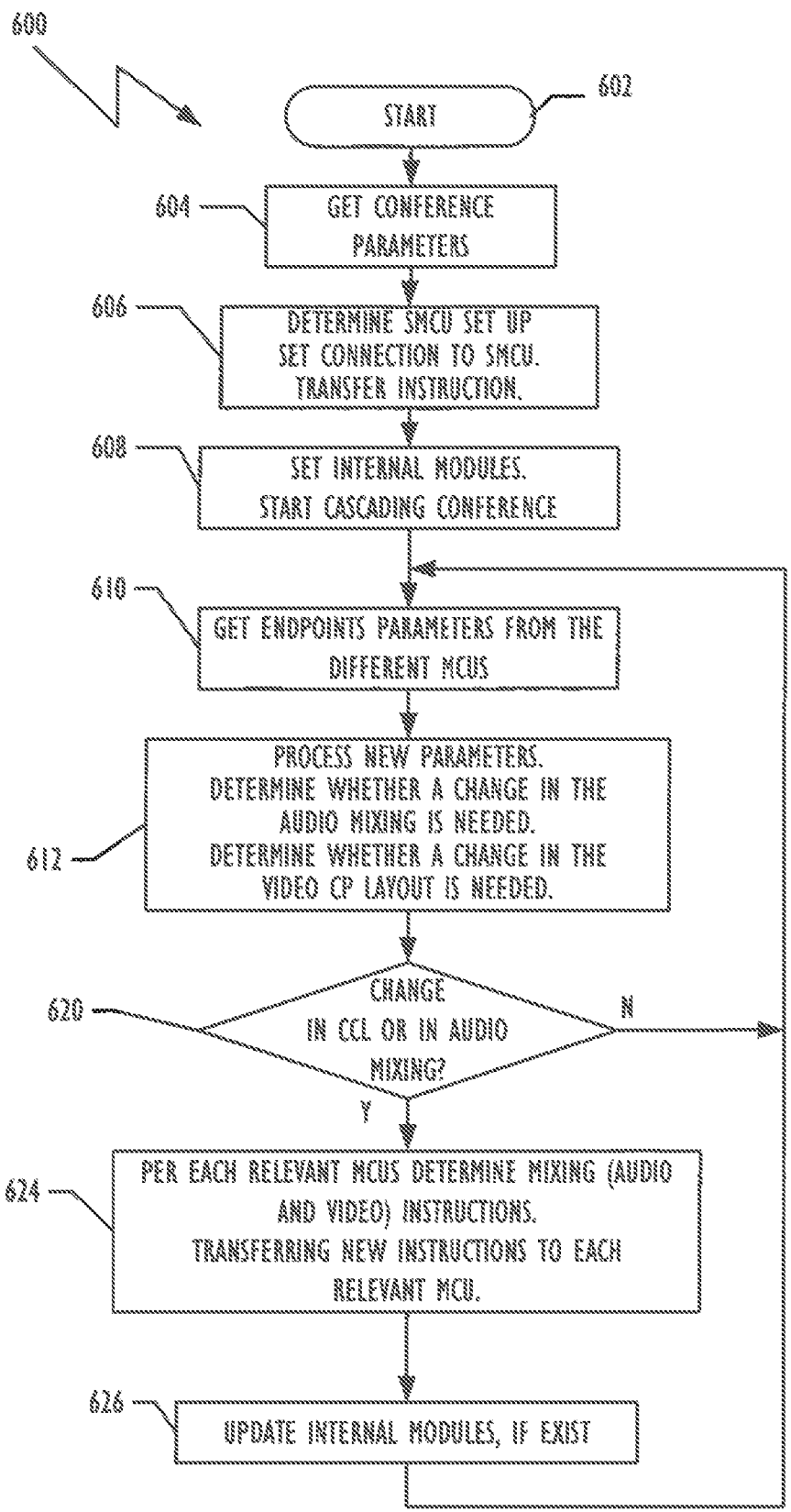
FIG. 6 is a flowchart illustrating a process for managing a CP cascading layout using a CCCC.

FIG. 6 is a flowchart illustrating a process 600 for establishing and controlling a cascading CP videoconference. For clarity and simplicity, process 600 is disclosed as it is implemented by an active CCCC 460 (FIG. 4) at the control module 440 (FIG. 4) of a MMCU. Different steps of process 600 can be modified in order to be used by CCCC that is installed in CS 312 (FIG. 3) or in each MCU for a distributed architecture. The process 600 may be initiated 602 by CS 312 at the starting time of the conference, for a reserved conference, or upon starting an ad-hoc cascading CP conference.

Upon initiation, conference parameters are collected 604 from the CS 312 via CM 462 (FIG. 4b). The parameters can include information such as but not limited to conference profile, other MCUs that are involved in the cascading conference and their ISDN number or IP address, dial out numbers or IP address of each endpoint involved in the conference and their associated MCU, etc. The conference profile can include information such as but not limited to: criteria for selecting one or more presented endpoints (i.e., selection parameters such as the loudest one or more speaker, whether one or more conferees are appointed as forced presented endpoint, etc.), a requested one or more layout, whether certain endpoints can have certain priorities, the duration of the conference, bit rate, etc. The collected information can be stored at CADB 468 (FIG. 4b).

Based on the received and stored information at CADB 468, DM 466 (FIG. 4b) may determine 606 the one or more CCL, the setup of each SMCU, how to organize the windows by each SMCU in its one or more composed associated CP video, the endpoints with which each MCU is associated with, the different criteria for selecting presented endpoints, and the responsibility for selecting presented endpoints (i.e. whether selection is done by the active CCCC or whether each MCU determines which of its associated conferee will be selected), etc. The MMCU may set a control and signaling connection with each other SMCU. The connection can be done out of band using IP network, for example, or in band.

In an embodiment that uses in band connection, the MMCU may first set a multimedia connection with each SMCU and then set the signaling and the control connection. After setting the signaling and the control connection between the active CCCC and each SMCU, relevant information is transferred to each MCU with a command to start the cascading conference with its associated one or more endpoints. In exemplary embodiment in which out of band signaling and control connection is used, starting the cascading conference command can include also a command to set a multimedia connection between the MMCU and the SMCUs, or by each MCU in the case of distributed architecture or when the CCCC is installed in the CS 312 (FIG. 3). For distributed architecture or an architecture in which the active CCCC is installed in CS 312, CS 312 may perform the above functionality (selecting layouts, associating MCUs with endpoints, etc) and may send the instructions to each of the MCUs.

After receiving the appropriate information related to the conference, each of the MCUs determines the required resources (audio, video, networking, data, etc.), allocates 608 those resources, and starts setting multimedia connections with each one of its associated endpoints and with the relevant other one or more MCUs (depending on the architecture of the conferencing system). A loop is started at step 610, running as long as the cascading CP conference is active and is terminated at the end of the cascading CP conference.

At step 610, information on each endpoint is retrieved from the different MCUs. The information about each endpoint can include current audio energy and the location of its window (if it exists) in the associated layout. The information can be stored in CCPL 464 (FIG. 4b). In exemplary embodiments of the present invention in which CCPL is a cyclic buffer, the set of information that belongs to the oldest sampling period can be deleted. The information that is stored in the CCPL is retrieved and processed 612 by DM 466 (FIG. 4b) for determining whether a change in the layout or/and the selection of the conferees (presented endpoints) is needed.

Different methods may be used; for example one method may define that the conferees (the number of conferees depends on the number of possible windows in the CCL) that have the higher audio energy during the last 'n' sampling periods are selected as the presented endpoints ('n' can be any number between one to the maximum number of sampling periods that are stored in CCPL 464). Other methods may select the most frequent loudest speakers in the entire sampling periods that are stored in CCPL; other methods may add a new participant instead of the weakest speaker that was selected in the last period. In an alternate embodiment, the removed presented endpoint can be the less frequent speaker, etc. Then process 600 may compare the new selected conferees with the current displayed ones for determining 620 whether a change in the current layout is needed. If 620, there is no need to change any of the current CCL or the selection of the presented endpoints, method 600 may return to step 610 and wait for the next iteration.

If 620 a change in CCL is needed (in the layout or in the selection of one or more conferees) DM 466 may determines 624 the required changes in each MCU. The changes may include a command to change the video and/or the audio mixing for the one or more relevant MCUs. The new setup is transferred via the signaling and control connection to each MCU. Upon receiving the new setup, each MCU updates 626 its internal resources accordingly in order to provide the required new audio and video mixing. Then method 600 returns to step 610 and waits for the next iteration.

Figure 7:
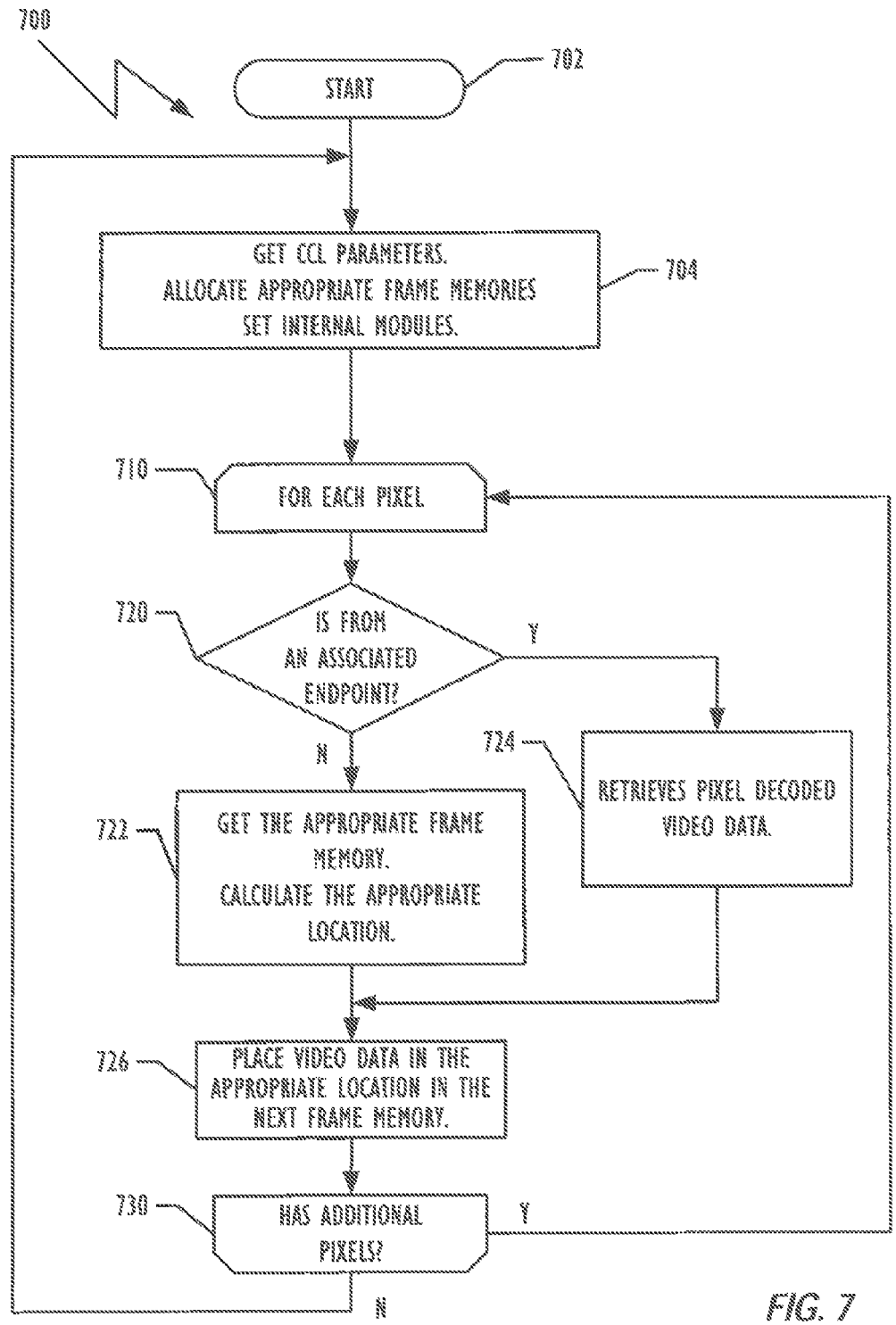
FIG. 7 is a flowchart illustrating relevant steps of a process used by a "Builder module" at a MCU.

FIG. 7 is a flowchart illustrating relevant steps of an exemplary process 700 that can be used by an exemplary "Builder module" 522 (FIG. 5) at an MCU. For clarity and simplicity of the explanation, process 700 is disclosed as it is implemented at the MCU by a builder 522 (FIG. 5) in an output module 520 (FIG. 5) that is associated with an endpoint 314 (FIG. 3). The steps of process 700 can be modified to be used by a builder 522 (FIG. 5) in an output module 520 (FIG. 5) that is associated with an MCU 316 (FIG. 3). Process 700 is initiated 702 by the control module 440 (FIG. 4a) after allocating all the resourced and establishing the connection with the associated endpoint or MCU according to the association of the output port 520 to which the builder 522 belongs.

After initiation, a frame loop is started at step 704. The loop runs as long as the associated endpoint (or MCU) is connected to the conference. The period of each cycle of the loop may depend on the frame rate that was defined for the relevant connection. At the beginning 704 of a new frame loop, builder 520 retrieves parameters that are associated with the layout of the new loop including information for retrieving the relevant decoded scaled video data streams from the DVCI 530 (FIG. 5). The collecting information depends on the type of DVCI 530. For a shared memory implementation, the information can be addresses of the different decoded scaled video data streams; for a TDM bus implementation of DVCI, the collecting information can be a relevant time slot, etc. Additional parameters that are associated with the layout of the new loop can be information related to the windows in the new frame. The information can include parameters such as the size and location of the window that is associated with each collected stream, etc. When one of the decoded scaled video data streams was created by another MCU (MMCU, SMCU or peer MCU) additional information may be needed to define the location and size of each window in decoded scaled video data stream and the location of the transparent color (background color) area, if it exists.

The retrieved parameters of the layout of the new frame memory are processed 704 and compared to the relevant parameters of the previous frame for determining whether a change in the layout is needed. If a change is needed, then an appropriate input frame memories can be allocated and an Intra frame command may be sent to encoder 526 (FIG. 5). An Intra frame is a non-referential image. Each allocated input frame memory is associated with one of the decoded scaled video data streams. Each input frame memory can grab its associated decoded scaled video data stream from the DVCI 530 as needed. In addition, a next composed frame memory is allocated. In an alternate embodiment, grabbing the information for each input frame memory may include scaling and filtering.

If builder 522 (FIG. 5) determines that there is no change in the layout or in the selection of one or more conferees (presented endpoints), the input frame memories are not affected and a new next composed frame memory is allocated for composing the next frame of the CCL. A loop is initiated between steps 710 and 730. The loop may run over each pixel in the new next composed frame memory starting from the first pixel at top left corner of the frame to the last pixel at the bottom left corner of the frame, line after line. For each pixel (location in the memory) a decision is made 720 whether the source of the data of the pixel belongs to an associated endpoint (an endpoint that is connected to the MCU that contain the relevant builder 522) or to other MCU. The decision can be based on location information that was retrieved in step 704. In an alternate exemplary embodiment, the builder may cover the composed frame one window after the other instead of pixel by pixel.

If 720, the pixel belongs to an associated endpoint, the decoded video data that is stored in the appropriate input frame memory in the address that belongs to the pixel, which will be place in the current location of the next frame memory, is retrieved 724 and copied 726 to the relevant location in the next frame memory. Then a decision is made 730 whether there are more pixels in the next composed frame memory. If yes, method 700 returns to step 710 and preparing the data for next pixel. If there are no more pixels, the current pixel is the last one pixel of the CCL frame (the bottom left corner pixel of the composed next frame) and method 700 returns to step 704 for starting the next frame cycle.

Returning to step 720, if the source of the data of the current pixel does not belong to an associated endpoint, it could be embedded within a composed associated CP frame data that was received from one of the MCUs or it could be an empty window. In the case the pixel belongs to a composed associated CP, then based on the location information that is received (during step 704) for each window in the relevant composed associated CP video frame, the location (address) in the relevant input frame memory is calculated 722. Then the decoded video data is retrieved and copied 726 (place) into the appropriate location of the new next frame memory and method 700 proceeds to step 730. In case that pixel belongs to an empty window, a background color or a slide information can be assigned to it.

In exemplary process that is implemented at the MCU by a builder 522 (FIG. 5) in an output module 520 (FIG. 5) associated with another MCU 314 (FIG. 3), steps 720 and 722 are modified. For example, if at step 720 the source of current pixel does not belong to an associated endpoint, then at step 722 the video data that will be written to the relevant address will reflect a transparent color.

In the present disclosure, the words "unit," "element," and "module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware.

In the description and claims of the present disclosure, "comprise," "include," "have," and conjugates thereof are used to indicate that the object or objects of the verb are not necessarily a complete listing of members, components, elements, or parts of the subject or subjects of the verb. Those skilled in the art will appreciate that the subject matter of the present disclosure can be implemented in the form of software for an MCU, additional hardware added to an MCU, or additional software/hardware distributed among MCUs.

It will be appreciated that the above-described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. A video processor, configured to:
   receive a plurality of video streams from a first plurality of endpoints;
   receive one or more associated continuous presence video streams from a video conferencing control unit, wherein the one or more associated continuous presence video streams comprise video streams from selected endpoints from a second plurality of endpoints associated with the video conferencing control unit;
   create one or more cascading continuous presence video streams comprising the video streams received from the first plurality of endpoints and the one or more associated continuous presence video streams received from the video conferencing control unit; and
   send the one or more cascading continuous presence video streams toward an endpoint of the first plurality of endpoints.

2. The video processor of claim 1, wherein the video processor comprises a controller configured to select one or more endpoints from the first plurality of endpoints to be included in the cascading continuous presence video stream.

3. The video processor of claim 2, wherein the controller is further configured to select one or more endpoints from the first plurality of endpoints to be included in a second one or more associated continuous presence video streams.

4. The video processor claim 3, wherein the video processor is further configured to:
   compose the second one or more associated continuous presence video streams, comprising video streams from the selected one or more endpoints from the first plurality of endpoints; and
   send the second one or more associated continuous presence video stream toward the video conferencing control unit.

5. The video processor of claim 1, wherein the video processor is embedded within a video conferencing control unit.

6. A video conferencing control unit, comprising:
   a network interface that is configured to communicate with a first plurality of endpoints that are associated with the video conferencing control unit and with a second video conferencing control unit that is associated with a second plurality of endpoints; and
   a video processor, coupled to the network interface, that is configured to:
      receive a plurality of video streams from the first plurality of endpoints;
      receive one or more associated continuous presence video streams from the second video conferencing control unit, wherein the one or more associated continuous presence video streams comprise video streams from selected endpoints from the second plurality of endpoints;
      create one or more cascading continuous presence video streams comprising video streams received from selected endpoints of the first plurality of endpoints and the one or more associated continuous presence video streams from the second video conferencing control unit; and
      send the one or more cascading continuous presence video streams toward an endpoint of the first plurality of endpoints via the network interface.

7. The video conferencing control unit of claim 6, wherein the selection of one or more endpoints from the first plurality of endpoints and the selection of endpoints from the second plurality of endpoints are performed independently of which video conferencing control unit is associated with which endpoints, based on at least one selection parameter received from each endpoint, the at least one selection parameter comprising audio energy.

8. The video conferencing control unit of claim 6, further comprising a controller configured to select one or more endpoints from the first plurality of endpoints to be included in the cascading continuous presence video stream.

9. The video conferencing control unit of claim 8, wherein the controller is further configured to select one or more endpoints from the first plurality of endpoints to be included in a second one or more associated continuous presence video streams.

10. The video conferencing control unit of claim 9, wherein the video processor is further configured to:
    compose the second one or more associated continuous presence video streams, comprising video streams from the selected one or more endpoints from the first plurality of endpoints; and
    send the second one or more associated continuous presence video stream toward the second video conferencing control unit.

11. A method of composing one or more cascading continuous presence video streams in a video conference involving a plurality of video conferencing control units, each video conferencing control unit associated with a plurality of endpoints, comprising:

receiving a plurality of video streams from a first plurality of endpoints associated with a first video conferencing control unit;

receiving one or more associated continuous presence video streams from a second video conferencing control unit, wherein the one or more associated continuous presence video streams comprise video streams from selected endpoints from a second plurality of endpoints associated with the second video conferencing control unit;

composing one or more cascading continuous presence video streams comprising video streams received from selected endpoints of the first plurality of endpoints and the one or more associated continuous presence video streams from the second video conferencing unit; and sending the one or more cascading continuous presence video streams toward an endpoint of the first plurality of endpoints.

12. The method of claim 11, wherein composing one or more cascading continuous presence video streams comprises:

selecting one or more endpoints of the first plurality of endpoints based on at least one selection parameter corresponding to at least one endpoint associated with each of the video conferencing control units received by a cascading continuous presence composition controller.

13. The method of claim 12, where selecting one or more endpoints to be included in the cascading continuous presence stream comprises:

selecting one or more endpoints independently of which video conferencing control unit is associated with which endpoints, based on at least one selection parameter received from each endpoint, the at least one selection parameter comprising audio energy.

* * * * *